US008598845B2

(12) United States Patent
Lim et al.

(10) Patent No.: US 8,598,845 B2
(45) Date of Patent: Dec. 3, 2013

(54) BATTERY CHARGERS, ELECTRICAL SYSTEMS, AND RECHARGEABLE BATTERY CHARGING METHODS

(75) Inventors: Khoon Cheng Lim, El Monte, CA (US); Lap Wai Chow, South Pasadena, CA (US)

(73) Assignee: Valence Technology, Inc., Las Vegas, NV (US)

( * ) Notice: Subject to any disclaimer, the term of this patent is extended or adjusted under 35 U.S.C. 154(b) by 935 days.

(21) Appl. No.: 12/426,855

(22) Filed: Apr. 20, 2009

(65) Prior Publication Data

US 2010/0264879 A1    Oct. 21, 2010

(51) Int. Cl.
*H02J 7/00* (2006.01)

(52) U.S. Cl.
USPC ........... 320/119; 320/139; 320/140; 320/141; 320/145

(58) Field of Classification Search
USPC ................................. 320/129, 139–141, 145
See application file for complete search history.

(56) References Cited

U.S. PATENT DOCUMENTS

| 3,800,208 | A  | * | 3/1974 | Macharg | 320/139 |
|---|---|---|---|---|---|
| 5,539,296 | A | * | 7/1996 | Ito | 320/108 |
| 6,841,974 | B2 | * | 1/2005 | Dykeman | 320/141 |
| 7,221,125 | B2 | * | 5/2007 | Ding | 320/139 |
| 2004/0164706 | A1 | * | 8/2004 | Osborne | 320/116 |
| 2008/0018300 | A1 | * | 1/2008 | Zaag et al. | 320/118 |
| 2008/0197811 | A1 | * | 8/2008 | Hartular et al. | 320/141 |
| 2008/0203969 | A1 | * | 8/2008 | Kurihara et al. | 320/116 |
| 2008/0252261 | A1 | * | 10/2008 | Seo | 320/139 |
| 2009/0066296 | A1 | * | 3/2009 | Wang et al. | 320/160 |
| 2009/0237028 | A1 | * | 9/2009 | Yorinobu et al. | 320/103 |

FOREIGN PATENT DOCUMENTS

GB        2237696 A * 5/1991

* cited by examiner

*Primary Examiner* — Jermele M Hollington
*Assistant Examiner* — Temilade S Rhodes-Vivour
(74) *Attorney, Agent, or Firm* — Brian T. Mangum; Cynthia S. Kovacevic; Roger A. Williams

(57) ABSTRACT

Battery chargers, electrical systems, and rechargeable battery charging methods are described. According to one aspect, a battery charger includes charge circuitry configured to apply a plurality of main charging pulses of electrical energy to a plurality of rechargeable cells of a battery to charge the rechargeable cells during a common charge cycle of the battery and to apply a plurality of secondary charging pulses of electrical energy to less than all of the rechargeable cells of the battery during the common charge cycle of the battery to charge the less than all of the rechargeable cells.

35 Claims, 6 Drawing Sheets

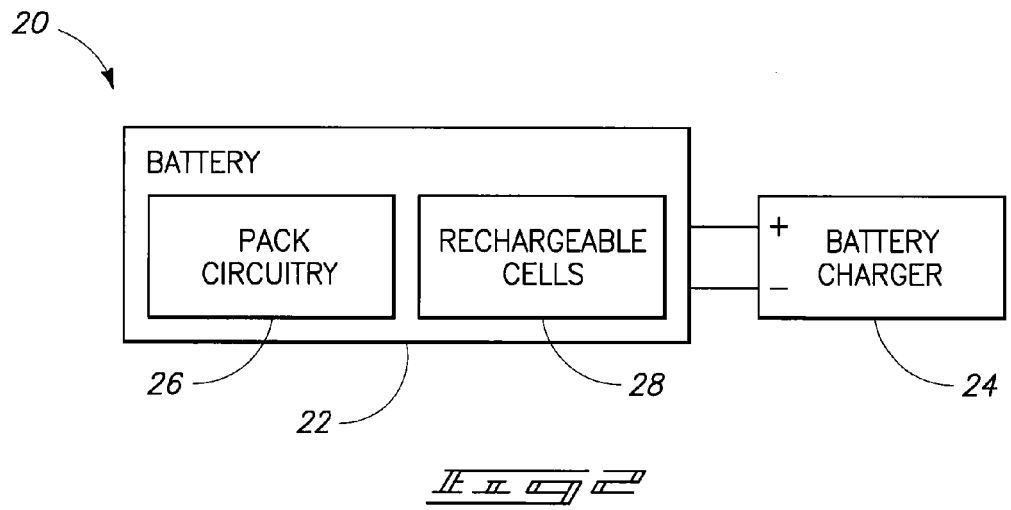
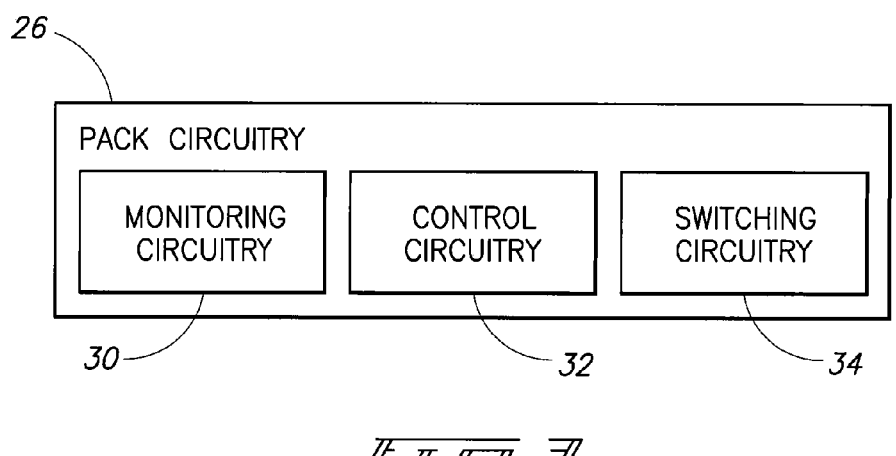

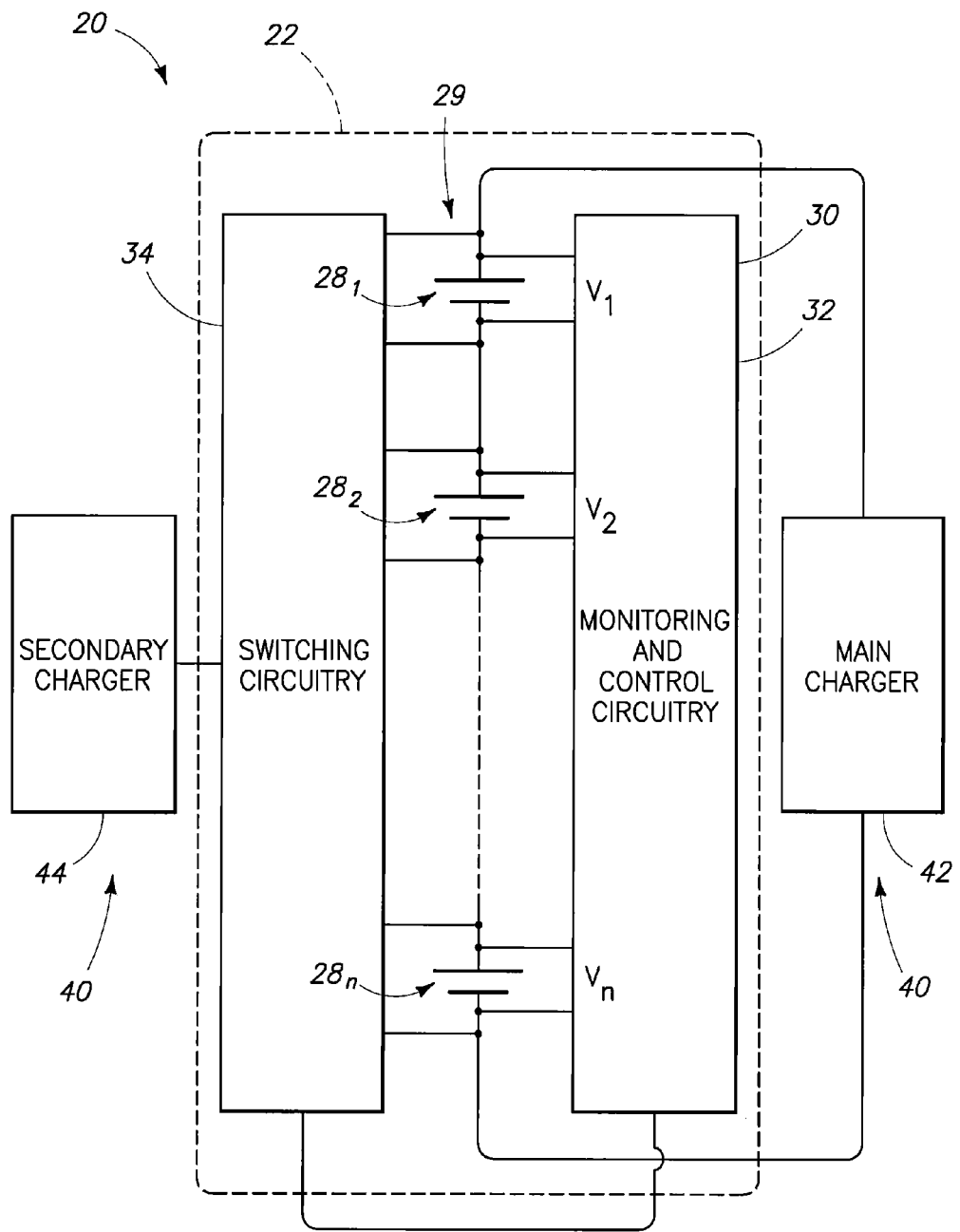

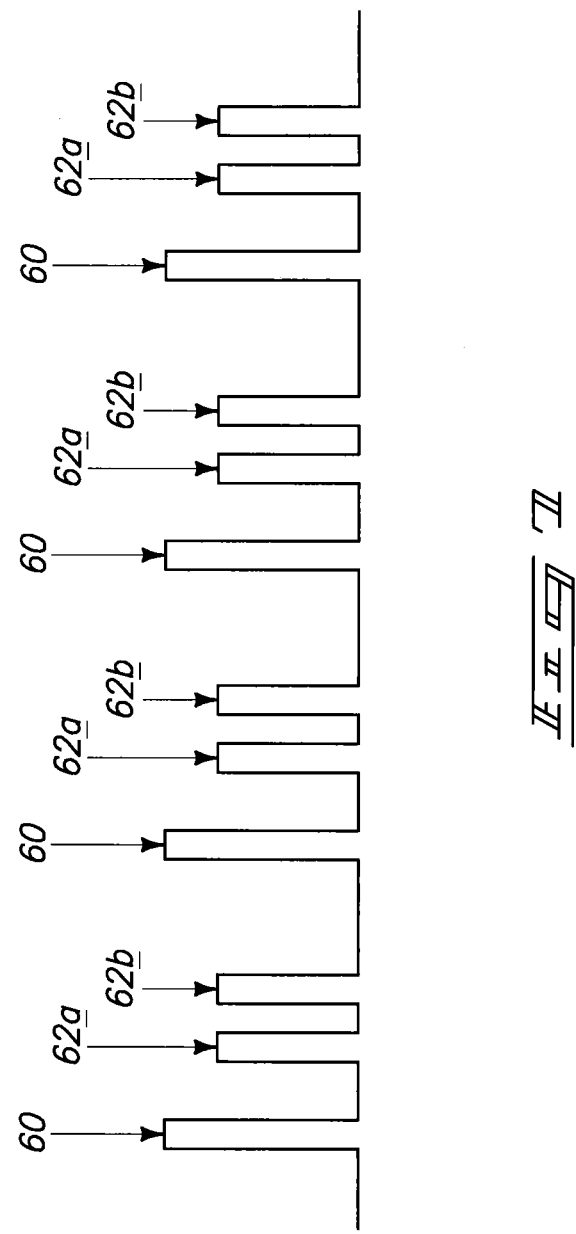

BATTERY CHARGERS, ELECTRICAL SYSTEMS, AND RECHARGEABLE BATTERY CHARGING METHODS

TECHNICAL FIELD

This disclosure relates to battery chargers, electrical systems, and rechargeable battery charging methods.

BACKGROUND OF THE DISCLOSURE

Rechargeable batteries are being used in and designed for varied applications with different requirements for electrical energy. The rechargeable battery systems comprise rechargeable cells which receive electrical energy during charging operations and supply electrical energy to a load during discharging operations. The rechargeable cells may have different chemistries and may include Lithium Ion cells in one example. The numbers of rechargeable cells used in different applications are varied depending upon the requirements of the loads, and the number of cells may be numerous in some implementations.

The rechargeable cells of a battery may be non-uniform, for example, as a result of manufacturing processes of the rechargeable cells. More specifically, different rechargeable cells of a battery may have different or non-uniform parameters (e.g., voltages, internal resistances or impedances, charge-discharge efficiencies). Non-uniformity of cells effectively links the performance of the battery to its least capable rechargeable cell. Furthermore, repeated cycling of rechargeable cells having non-uniform voltage-capacity characteristic curves may lead to increased reduction of capacity of the battery.

In some arrangements, batteries may have hundreds or thousands of rechargeable cells connected together, for example, in series. Typically, the rechargeable cells are charged in series. However, the rechargeable cells may perform differently due to the non-uniformities of the rechargeable cells and the states of charge of the rechargeable cells may vary during charging of the rechargeable cells due to the non-uniformities. More specifically, the voltage-capacity characteristic curves of the rechargeable cells may not be linear during charging or discharging. Some of the rechargeable cells may be fully charged or fully discharged faster than other rechargeable cells due to non-uniformities of the cells which may limit the capacity of the battery which may also be decreased further in subsequent charge/discharge cycles.

FIG. 1 illustrates one conventional approach to account for non-uniformities of the rechargeable cells of a given battery during charging. In particular, a plurality of shunting circuits each including a resistor 14 and logic control switch 16, such as a power MOSFET, may be coupled in parallel with respective rechargeable cells 12. The shunting circuits operate to shunt excess current around respective ones of the rechargeable cells 12 which have reached their maximum voltages quickly, thereby partially or fully bypassing such rechargeable cells 12 and slowing the charging of such cells 12.

The amount of current which may be shunted using the shunting circuits may be limited due to heat generated by resistors 14 conducting the excess current, especially in applications using enclosed battery packs. Accordingly, charge currents may be limited in some implementations to avoid generation of excessive heat. Furthermore, these circuits may not be effective in relatively large batteries having a relatively large number of cells if capacities of the rechargeable cells differ by more than a few percent.

At least some aspects of the disclosure are directed towards improved charging devices, electrical systems, and associated methods as described in more detail below.

BRIEF DESCRIPTION OF THE DRAWINGS

Exemplary embodiments of the disclosure are described below with reference to the following accompanying drawings.

FIG. 2 is a functional block diagram of an electrical system according to one embodiment.

FIG. 3 is a functional block diagram of pack circuitry of a battery according to one embodiment.

FIG. 4 is an illustrative representation of an electrical system according to one embodiment.

FIG. 6 is an illustrative representation of switching circuitry according to one embodiment.

FIG. 7 is a timing diagram depicting a plurality of main pulses and a plurality of secondary pulses according to one embodiment.

DETAILED DESCRIPTION OF THE DISCLOSURE

Figure 1:
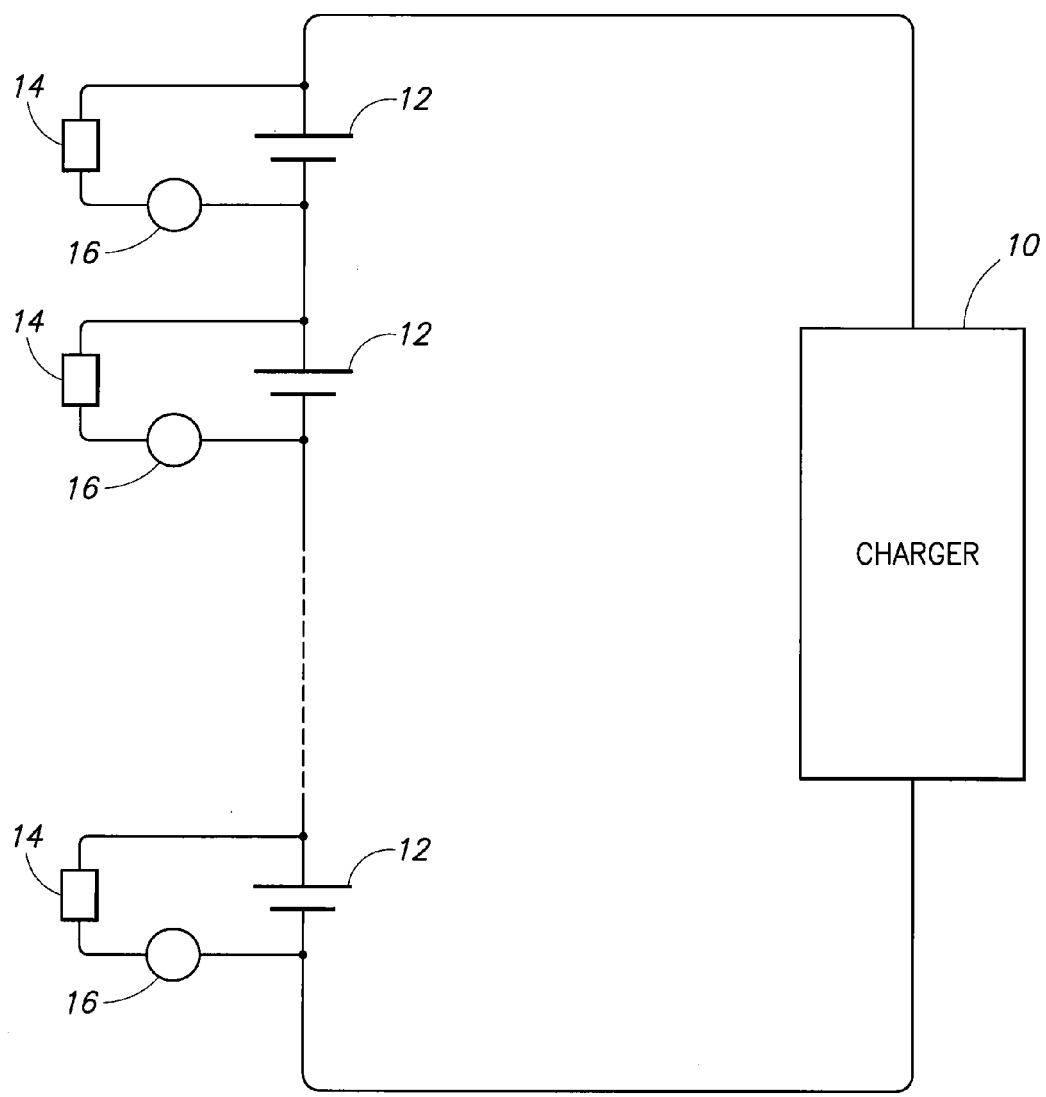
FIG. 1 is an illustrative representation of a conventional battery and charger.

This disclosure is submitted in furtherance of the constitutional purposes of the U.S. Patent Laws "to promote the progress of science and useful arts" (Article 1, Section 8).

At least some aspects of the present disclosure are directed towards charging operations of rechargeable batteries. The rechargeable batteries may individually comprise a plurality of rechargeable cells. Non-uniformities may exist between the rechargeable cells of a given battery, for example, due to manufacturing processes and tolerances. At least some aspects of the disclosure are directed towards providing substantially balanced charging of the rechargeable cells of a battery where the states of charge of the rechargeable cells are substantially the same during the charge process. One embodiment of the disclosure provides an increased amount of charging electrical energy to one or more rechargeable cells of a battery being charged (compared with an amount of charging electrical energy provided to other rechargeable cells of the battery) and which have lower states of charge than the other rechargeable cells of the battery. In one example, a plurality of pulses, including main and secondary pulses, of electrical energy are used to charge the battery. Additional embodiments and aspects are discussed below.

According to one embodiment, a battery charger comprises charge circuitry configured to apply a plurality of main charging pulses of electrical energy to a plurality of rechargeable cells of a battery to charge the rechargeable cells during a common charge cycle of the battery and to apply a plurality of secondary charging pulses of electrical energy to less than all of the rechargeable cells of the battery during the common charge cycle of the battery to charge the less than all of the rechargeable cells.

According to an additional embodiment, a battery charger comprises charge circuitry configured to apply different numbers of charging pulses of electrical energy to different ones of a plurality of rechargeable cells of a battery during a common charge cycle of the battery and corresponding to the rechargeable cells having different states of charge.

According to another embodiment, an electrical system comprises a battery comprising a plurality of rechargeable cells individually configured to receive charging electrical energy and to discharge electrical energy to a load, charge circuitry configured to apply a plurality of main charging pulses to the rechargeable cells to charge the rechargeable cells during a common charge cycle of the battery and to apply a plurality of secondary charging pulses to at least one of the rechargeable cells during the common charge cycle of the battery, monitoring circuitry configured to monitor states of charge of the rechargeable cells during the common charge cycle of the battery and to detect the at least one of the rechargeable cells having a state of charge lower than states of charge of others of the rechargeable cells of the battery, and control circuitry coupled with the monitoring circuitry and configured to use the monitoring of the monitoring circuitry to control the charge circuitry to apply the secondary charging pulses to the at least one of the rechargeable cells having the lower state of charge than the states of charge of the others of the rechargeable cells to substantially balance the states of charge of the rechargeable cells of the battery during the common charge cycle of the battery.

According to yet another embodiment, a rechargeable battery charging method comprises applying electrical energy to charge a first number of rechargeable cells of a battery at a plurality of first moments in time during a common charge cycle of the battery, monitoring an electrical characteristic of the rechargeable cells, and using the monitoring, applying electrical energy to charge a second number of the rechargeable cells of the battery at a plurality of second moments in time during the common charge cycle of the battery, and wherein the second number is less than the first number.

According to still another embodiment, a rechargeable battery charging method comprises applying a plurality of main charging pulses of electrical energy to charge a plurality of rechargeable cells of a battery during a common charge cycle of the battery, and during the common charge cycle of the battery, applying a plurality of secondary charging pulses of electrical energy to charge at least one of the rechargeable cells of the battery having a lower state of charge compared with states of charge of others of the rechargeable cells of the battery.

Referring to FIG. 2, an electrical system 20 is depicted according to one embodiment. The electrical system 20 includes a rechargeable battery 22 coupled with a battery charger 24. Battery 22 includes a plurality of rechargeable cells 28 in one embodiment. Battery charger 24 is configured to provide charging electrical energy to the rechargeable cells 28 to charge battery 22. Although a load is not shown in FIG. 2, battery 22 may be arranged to provide electrical energy stored within the rechargeable cells 28 to an external load during discharge operations of the battery 22. In some arrangements, the battery 22 may be disconnected from battery charger 24 for use in discharge operations to power a load following charging of the battery 22 using the battery charger 24. In other embodiments, battery charger 24 may be internal of a housing of the battery 22 and may be considered to be a part of or integral with the battery 22. Furthermore, according to additional example embodiments of the disclosure, some or all of the pack circuitry 26 may be part of or internal with the battery charger 24, and for example, external of a battery housing which houses the rechargeable cells 28 in but one example.

The example embodiment of the battery 22 shown in FIG. 2 includes pack circuitry 26 and a plurality of rechargeable cells 28, for example, arranged in a battery pack of battery 22. The rechargeable cells 28 may be charged during charge operations (and store electrical energy) and discharged during discharge operations. Different batteries 20 may include different numbers of rechargeable cells 28 which may be arranged in different series and/or parallel configurations depending upon the requirements of the load to be powered. In one embodiment, rechargeable cells 28 individually providing 1-5 Volts and a capacity of approximately 10 Ah may be used. In one embodiment, rechargeable cells 28 may be embodied as Lithium-ion cells, for example available from Valance Technology, Inc., and may individually have an operational voltage of 3.2 Volts in one example. Other rechargeable cells 28 having different configurations and/or chemistries may be used in other embodiments.

Pack circuitry 26 is configured to perform various operations of the battery 22. As described further below, pack circuitry 26 is configured to provide monitoring operations of the rechargeable cells 28 and to control charging operations of the rechargeable cells 28.

As mentioned previously, battery charger 24 may be integral with the battery 22 or provided as an entity separate from the battery 22 in example embodiments. Battery charger 24 may receive electrical energy from an external source (not shown), such as AC mains, an alternator, or other appropriate AC or DC source. Battery charger 24 is configured to apply electrical energy to the battery 20 to charge the rechargeable cells 28.

According to one embodiment, charge circuitry of battery charger 24 (charge circuitry is shown in example configurations in FIGS. 2 and 3) is configured to provide different amounts of electrical energy (e.g., different number of charging pulses of electrical energy) to different ones of the rechargeable cells 28 to provide substantially balanced charging of the rechargeable cells 28 during a common charging cycle of the battery 22. As discussed further below according to one embodiment, the charge circuitry of the battery charger 24 provides an increased amount of charging electrical energy to rechargeable cells 28 having a lower state of charge compared with an amount of charging electrical energy applied to others of the rechargeable cells 28 which have a balanced nominal state of charge as discussed herein. In one embodiment, the charge circuitry applies the charging electrical energy in a plurality of charging pulses, and the charge circuitry applies an increased number of the charging pulses to the rechargeable cells 28 having the lower state of charge. Other charging embodiments are possible.

In one embodiment, battery charger 24 comprises charge circuitry which is configured to provide main charging electrical energy and secondary charging electrical energy to the rechargeable cells 28. The charge circuitry of the battery charger 24 provides the main charging electrical energy to all of the rechargeable cells 28 and secondary charging electrical energy to less than all of the rechargeable cells 28 (e.g., the secondary charging electrical energy is applied to one or more of the rechargeable cells 28 having lower states of charge than a nominal state of charge of the rechargeable cells 28 as discussed below). The charge circuitry of the battery charger 24 provides the secondary charging electrical energy to the rechargeable cells 28 having the lower states of charge to increase the charging rates and states of charge of such rechargeable cells 28. For example, the provision of the secondary charging electrical energy to the rechargeable cells 28 having the lower states of charge charges the rechargeable cells 28 having the lower states of charge faster than the rechargeable cells 28 not receiving the secondary charging electrical energy.

According to one example embodiment, the charge circuitry of the battery charger 24 provides the main charging electrical energy in the form of a plurality of main charging pulses and the secondary charging electrical energy in the form of a plurality of secondary charging pulses. The charge circuitry of the battery charger 24 may include a main charger and one or more secondary charger (not shown in FIG. 2) to provide respective ones of the main and secondary charging electrical energy to the rechargeable cells 28 in one embodiment. In one embodiment, the main and secondary charger(s) may be electrically isolated from one another. For example, the main and secondary chargers may be arranged to not share the same ground, and in one configuration, the secondary charger(s) may be isolated from ground of the main charger (e.g., which is at the same reference as ground of the external source of electricity in one embodiment) via a transformer in one embodiment. Additional details regarding charging operations according to example embodiments of the disclosure are described below.

Referring to FIG. 3, one embodiment of pack circuitry 26 is shown. Pack circuitry 26 includes monitoring circuitry 30, control circuitry 32 and switching circuitry 34 in one embodiment. Other embodiments of pack circuitry 26 are possible including more, less and/or alternative circuitry.

Monitoring circuitry 30 is configured to monitor an electrical characteristic of the rechargeable cells 28 in one configuration. For example, it is desired to monitor states of charge of individual ones of the rechargeable cells 28 to provide substantially balanced charging of the rechargeable cells 28 in one embodiment. Monitoring circuitry 30 is configured to monitor voltages of individual ones of the rechargeable cells 28 and which may be used to provide state of charge information regarding the rechargeable cells 28 in one embodiment. Additional and/or alternative electrical characteristics of rechargeable cells 28 or electrical system 20 may be monitored in other embodiments. For example, charging currents may be monitored in some arrangements.

Control circuitry 32 is configured to process information and control various operations of battery 22 in the illustrated configuration. Control circuitry 32 includes a processor configured to execute executable code in the form of ordered instructions in one embodiment. Control circuitry 32 may additionally or alternatively include other hardware (e.g., ASICs) to control operations of the battery 22. In one embodiment, control circuitry 32 is configured to monitor the battery 22 (e.g., monitor electrical characteristics of the battery 22 using output from monitoring circuitry 30) and control operations of the battery 22 responsive to the monitoring. In one specific example, control circuitry 32 is configured to receive information regarding one or more electrical characteristics of rechargeable cells 28 (e.g., voltages of the rechargeable cells 28) from monitoring circuitry 30 and to determine states of charge of the rechargeable cells 28 using the received information. As described in additional detail below according to example embodiments of the disclosure, control circuitry 32 may use the state of charge information of the rechargeable cells 28 to control switching circuitry 34 to provide different amounts of electrical energy to different ones of the rechargeable cells 28 to provide substantially balanced charging of the rechargeable cells 28.

Switching circuitry 34 is configured to selectively apply secondary charging electrical energy to one or more of the rechargeable cells 28 in one embodiment. Switching circuitry 34 may couple one or more secondary chargers of battery charger 24 with one or more of the rechargeable cells 28, respectively, or couple a single secondary charger with the one or more of the rechargeable cells 28 at different moments in time using multiplexed functions according to example embodiments.

Referring to FIG. 4, one example of an electrical system 20 is shown according to one embodiment. The battery 22 includes a single string 29 of a plurality of rechargeable cells 28 coupled in series with one another. Additional strings including rechargeable cells 28 which are coupled in series may be coupled in parallel with the illustrated string 29 of rechargeable cells 28 to increase the capacity of the battery 22 in some configurations. Furthermore, the monitoring and control circuitry 30, 32 of FIG. 3 is shown within a single circuit component in the illustrated example embodiment. Monitoring and control circuitry 30, 32 may be implemented as separate components in other embodiments. Furthermore, charge circuitry 40 of the battery charger 24 of FIG. 2 includes a main charger 42 and a secondary charger 44 in the illustrated embodiment.

In one embodiment, main charger 42 is configured to provide main charging electrical energy to all of the rechargeable cells 28 of the battery 22 during a charge cycle of battery 22. As mentioned above and in accordance with one embodiment, the main charger 42 is configured to provide the main charging electrical energy in the form of a plurality of main charging pulses which are applied to all of the rechargeable cells 28 of battery 22 at a plurality of moments in time (e.g., according to a period) during a common charging cycle of the battery 22. In one embodiment, a common charging cycle of the battery 20 refers to charging of rechargeable cells 28 of the battery 20 following partial or complete discharge of the rechargeable cells 28 to increased states of charge (e.g., full charge of battery 22) and prior to subsequent discharge of the rechargeable cells 28. In one embodiment, the main charger 42 provides main charging pulses according to a period during the entirety of the charging cycle.

In addition, secondary charger 44 may also apply secondary charging electrical energy to one or more of the rechargeable cells 28 during a common charging cycle of the battery 22 where the main charger 42 is charging the rechargeable cells 28. In one embodiment, the secondary charger 44 provides the secondary charging electrical energy in the form of a plurality of secondary charging pulses. In one example, the secondary charging pulses are individually provided to the one or more rechargeable cells 28 intermediate a pair of the main charging pulses.

As discussed previously, some embodiments of the disclosure provide substantially balanced charging of the rechargeable cells 28 during charging operations of the battery 22. For example, the rechargeable cells 28 have substantially the same state of charge during a charging cycle in one embodiment. If rechargeable cells 28 were ideally uniform, they would charge at substantially the same nominal rate. Furthermore, uniform rechargeable cells 28 would have substantially the same nominal state of charge during the charging, for example, using the main charging electrical energy only. However, the rechargeable cells 28 may not be uniform, for example, due to manufacturing tolerances, and may have non-uniformities such as different internal impedances which may lead to the rechargeable cells 28 charging at different rates. Accordingly, the states of charge of one or more of the rechargeable cells 28 may not be balanced with the nominal state of charge of others of the rechargeable cells 28 using the main charging electrical energy. In one embodiment, monitoring and control circuitry 30, 32 are configured to monitor one or more electrical characteristics of the rechargeable cells 28 and which are used to control charging operations of the battery 22 and/or battery charger 24 to provide substantially balanced charging of the rechargeable cells 28 during the common charging cycle where the states of charge of the rechargeable cells 28 are substantially balanced (e.g., the states of charge of the rechargeable cells 28 are within approximately 1% of one another).

According to one embodiment, monitoring and control circuitry 30, 32 monitors voltages $V_1$-$V_n$ of respective individual rechargeable cells $28_1$-$28_n$ (or respective individual banks of cells which may include the depicted cells $28_1$-$28_n$ as well as cells of other strings which may be individually coupled in parallel with individual cells $28_1$-$28_n$ of the illustrated string). Monitoring and control circuitry 30, 32 may determine the states of charge of the rechargeable cells $28_1$-$28_n$ using the received voltages $V_1$-$V_n$ in one embodiment.

Monitoring and control circuitry 30, 32 is configured to control the switching circuitry 34 to apply secondary charging electrical energy from one or more secondary chargers 44 to one or more of the rechargeable cells $28_1$-$28_n$ which are at states of charge less than the nominal state of charge of the other rechargeable cells $28_1$-$28_n$ (e.g., as indicated by the received voltages of the cells) having substantially the same state of charge. As mentioned above, the rechargeable cells $28_1$-$28_n$ typically charge at the same nominal rate of charge during a charging cycle of the battery 22 and most of the rechargeable cells $28_1$-$28_n$ are typically provided at the same increasing nominal states of charge during the charging cycle (i.e., the nominal state of charge of the rechargeable cells 28 (and the battery 22) increases during the charging cycle). However, as mentioned above, one or more of the rechargeable cells $28_1$-$28_n$ (or banks of cells) may charge slower than the nominal rate of charge of others of the rechargeable cells 28 due to non-uniformities. In one embodiment, one or more of the rechargeable cells $28_1$-$28_n$ may be considered to be out of balance if the state of charge of the one or more of the rechargeable cells $28_1$-$28_n$ varies more than approximately 1% from the nominal state of charge of the others of the rechargeable cells $28_1$-$28_n$. The application of the secondary charging electrical energy to the one or more out-of-balance rechargeable cells $28_1$-$28_n$ charges such cells at a faster rate compared with rates of charge of the balanced rechargeable cells $28_1$-$28_n$ which only receive the main charging electrical energy in one embodiment.

During the application of secondary charging electrical energy (e.g., pulses), the states of charge of one or more of the rechargeable cells $28_1$-$28_n$ having the reduced states of charge and which receive the secondary charging electrical energy may become balanced with the nominal state of charge of the others of the rechargeable cells $28_1$-$28_n$. Monitoring and control circuitry 30, 32 may control the switching circuitry 34 to cease the application of the secondary charging pulses to the one or more of the rechargeable cells $28_1$-$28_n$ during the common charging cycle after such cells have attained the substantially balanced state of charge where the states of charge of such cells are substantially balanced with the nominal state of charge of the other balanced rechargeable cells $28_1$-$28_n$.

Figure 5:
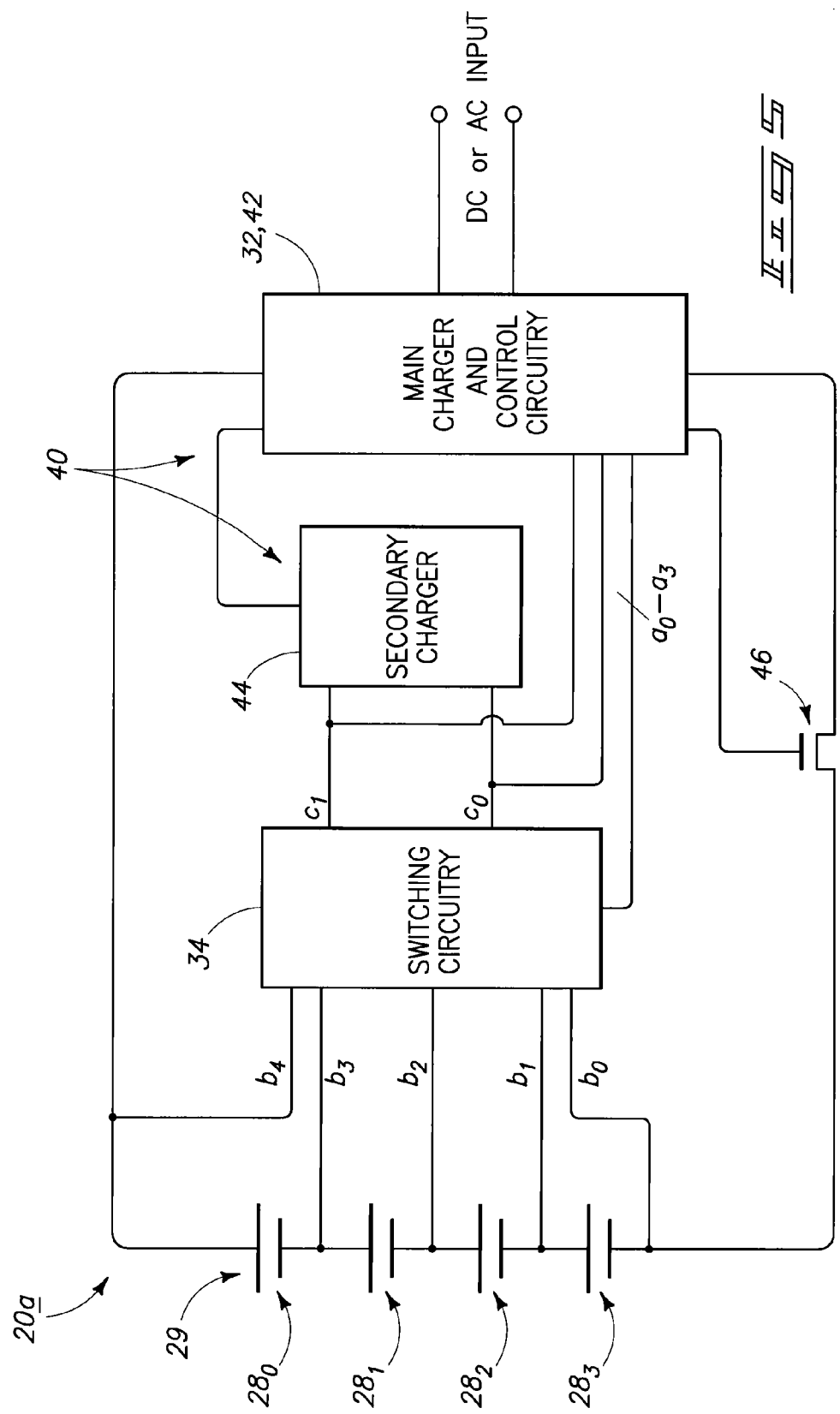
FIG. 5 is an illustrative representation of an electrical system according to one embodiment.
Figure 5:
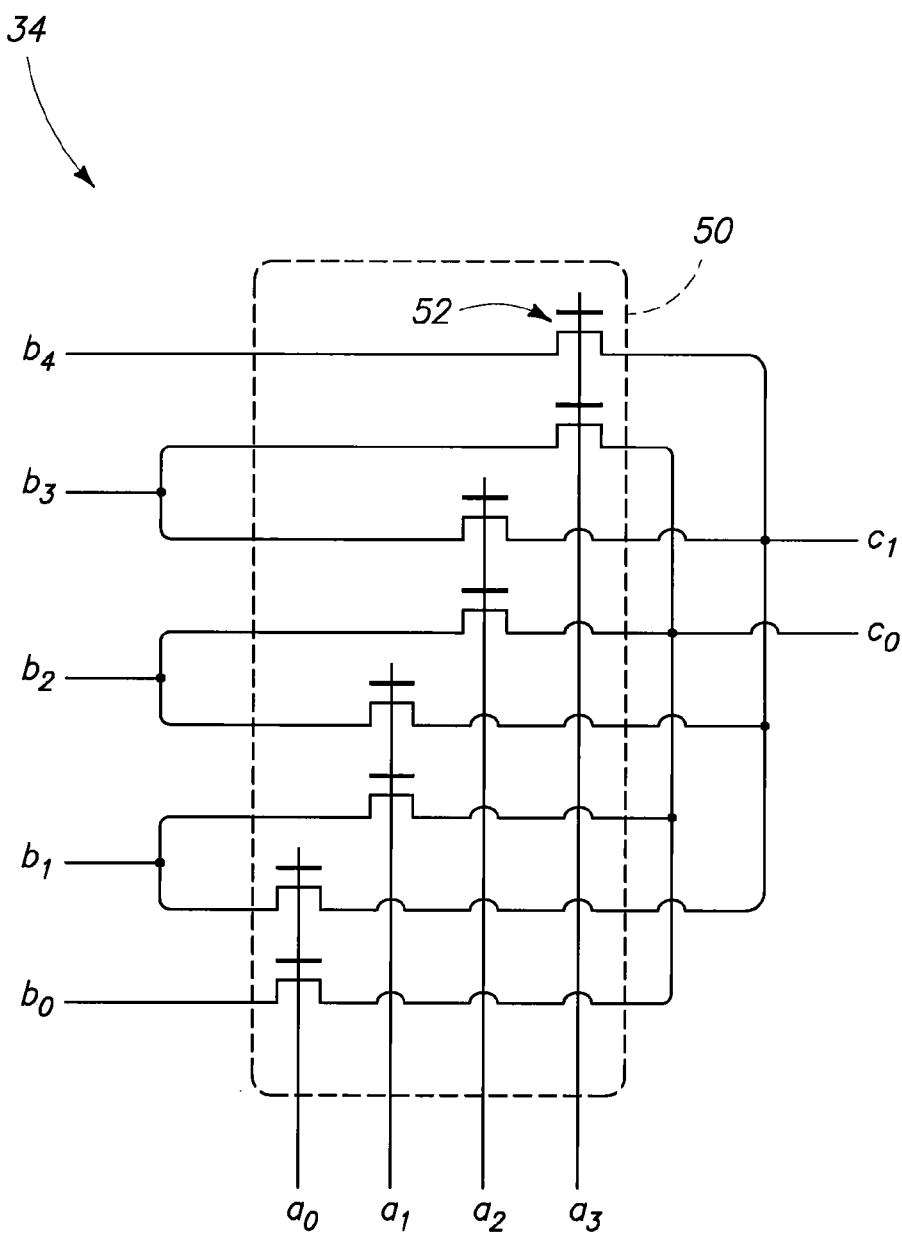

Referring to FIG. 5, another embodiment of electrical system is shown with reference to reference 20a. In the illustrated example embodiment, control circuitry 32 and main charger 42 are implemented as a single component and monitoring circuitry 30 is not explicitly shown. Four rechargeable cells $28_0$-$28_3$ are coupled in series in the depicted embodiment. The main charger 42 and secondary charger 44 may be coupled with a DC or AC external source (via the DC or AC input). Control circuitry 32 is configured to receive information regarding the voltages at nodes $b_1$-$b_4$ and to determine the states of charge of rechargeable cells $28_0$-$28_3$ during a charging cycle.

Main charger 42 provides main charging electrical energy to all of the rechargeable cells 28 during a charge cycle of battery 22 in one embodiment. The control circuitry 32 may control the switching circuitry 34 (e.g., via control signals $a_0$-$a_3$) to selectively apply secondary charging electrical energy (e.g., which was received via connections $c_0$ and $c_1$ from secondary charger 44) to one or more of the rechargeable cells $28_0$-$28_3$ which are out of balance with the others of the rechargeable cells $28_0$-$28_3$. Switching circuitry 34 applies the secondary charging electrical energy to appropriate rechargeable cells $28_0$-$28_3$ via respective nodes $b_1$-$b_4$ in the depicted embodiment. In one embodiment, control circuitry 32 may control a switching device 46 to selectively apply the main charging electrical energy in the form of the main charging pulses and the secondary charging electrical energy in the form of secondary charging pulses to the rechargeable cells $28_0$-$28_3$ during a charging cycle.

Referring to FIG. 6, one embodiment of switching circuitry 34 of FIG. 5 in the form of a multiplexer 50 is shown. Multiplexer 50 includes a plurality of switches 52 which are configured to selectively apply secondary charging electrical energy received via terminals $c_0$ and $c_1$ (e.g., FIG. 5) to respective ones of nodes $b_1$-$b_4$. Control circuitry 32 of FIG. 5 applies addressing control signals $a_0$-$a_3$ to the switches 52 to control the application of the secondary charging electrical energy from the secondary charger 44 to one or more of the rechargeable cells $28_0$-$28_3$ coupled with nodes $b_1$-$b_4$, respectively, and which are out-of-balance. The illustrated arrangement permits secondary charging electrical energy from a single secondary charger 44 to be applied to one or more of the rechargeable cells 28 during a single common charging cycle (where the main charging electrical energy is also used for charging). In some embodiments, additional secondary chargers may be used to provide secondary charging electrical energy to respective ones of a plurality of the rechargeable cells 28.

Referring to FIG. 7, a timing diagram illustrating the application of charging pulses (e.g., DC charging pulses) to the rechargeable cells 28 of a battery 22 versus time progressing to the right is shown according to one embodiment. In particular, a plurality of main charging pulses 60 are provided to all of the rechargeable cells 28 of the battery 22 at a plurality of first moments in time according to one embodiment. The first moments in time are determined according to a period during the charging cycle of the battery 22 in one example.

FIG. 7 also depicts a plurality of secondary charging pulses 62a, 62b which are applied to two rechargeable cells 28 (or two banks individually comprising a plurality of rechargeable cells 28 coupled in parallel), respectively, which have lower states of charge compared with the nominal state of charge of the other rechargeable cells 28 of the battery 22 during the charging of the charge cycle. The secondary pulses 62a, 62b may be applied to the one or more rechargeable cells 28 during off portions of the duty cycle of main pulses 60 in one embodiment. For example, the secondary pulses 62a, 62b may be applied at a plurality of second moments in time intermediate the first moments in time corresponding to the main charging pulses 60 in one embodiment.

The first of the secondary charging pulses 62a may be applied to one of the out-of-balance rechargeable cells 28 and the other of the secondary charging pulses 62b may be applied to another of the out-of-balance rechargeable cells 28 until the states of charge of such out-of-balance rechargeable cells 28 are substantially in balance with the nominal state of charge of the balanced rechargeable cells 28 of the battery 22. Additional secondary charging pulses may also be provided to charge other rechargeable cells 28 which are out-of-balance in another embodiment. As mentioned above, the secondary charging pulses 62a, 62b may be applied to the respective rechargeable cells 28 during off portions of the duty cycle of the main charging electrical energy. In the example of FIG. 7 with time progressing from left to right, the first secondary pulses 62a, 62b to occur in time are in between a pair of main charging pulses 60 (which are the first two pulses 60 to occur in time in FIG. 7) which are immediately adjacent to the first secondary pulses 62a, 62b to occur in time.

The secondary charging pulses 62a, 62b may be generated using time division multiplexing of secondary charging electrical energy provided by a single secondary charger 44 in one embodiment. Alternatively, a plurality of secondary chargers 44 may be provided to generate respective ones of the secondary charging pulses 62a, 62b. In such an example arrangement comprising a plurality of secondary chargers 44, the secondary pulses 62a, 62b for different rechargeable cells 28 may be generated and applied to the respective rechargeable cells 28 at the same moment in time or different moments in time.

The charging circuitry 40 may be configured to provide the main and secondary charging pulses 60, 62 having different characteristics in different embodiments. For example, the amplitude (or magnitude) and/or duty cycles of the main and secondary charging pulses 60, 62 may be varied for different embodiments. The electrical characteristics of the main and secondary charging pulses 60, 62 may be chosen to correspond to the capacity of the battery 22 in one embodiment.

In some arrangements, the rechargeable cells 28 (e.g., Lithium-ion cells) may be charged using a constant current/constant voltage charging scheme during a charging cycle of the rechargeable cells 28. In one more specific example using a constant current/constant voltage charging scheme, the rechargeable cells 28 are initially charged using main and secondary charging pulses 60, 62 having a constant current. After the rechargeable cells 28 are charged to a specified state of charge (e.g., 90%), the battery charger 24 may switch operation to provide pulses 60, 62 of constant voltage. Other charging schemes are possible in other embodiments.

In one embodiment, the current of the main and secondary charging pulses 60, 62 during the constant current portion of the charging cycle may be determined using the capacity of the battery 22 and the duty cycles of the pulses 60, 62. For example, if the battery 22 has a capacity of 10 Ahr, a charging current of one half capacity is 5 Amperes. With the pulses 60, 62 having a duty cycle of 10% in one example, a charging current for the main and secondary pulses 60, 62 of ten times 5 Amperes would charge the rechargeable cells 28 at substantially the same rate as if they were charged with constant non-pulsed charging electrical energy having a current of 5 Amperes. In one example embodiment, main and secondary pulses 60, 62 may individually have a constant current between 20-50 Amperes and a duty cycle of 10% during the constant current portion of the charging cycle. The use of pulses 60, 62 having higher currents may shorten charging times of the rechargeable cells 28. In some embodiments, secondary pulses 62 may have lower currents than the main pulses 60 (e.g., 20-30 Amperes). In one example of FIG. 7 having a period of 10 seconds, the pulses 60, 62 may individually have a duration of 1 second.

Control circuitry 32 (FIG. 3) is configured to monitor electrical characteristics of the rechargeable cells 28 during the charging operations to control operations of battery charger 24 in one embodiment. For example, control circuitry 32 may monitor one or more electrical characteristic of the rechargeable cells 28 to determine an appropriate moment in time to switch operation of the battery charger 24 from a constant current mode of operation to a constant voltage mode of operation. In one embodiment, control circuitry 32 monitors voltages of the rechargeable cells 28 during the charging operations to monitor the states of charge of the rechargeable cells 28. In one embodiment, voltages of the cells 28 may be monitored after pulse 60 and before pulse 62a for each period. In one embodiment, the rechargeable cells 28 reaching a maximum voltage of the cells (e.g., 3.7 Volts per cell for graphite/lithium iron phosphate cells) during charging with constant current electrical energy indicates that the rechargeable cells 28 have reached a defined state of charge (e.g., approximately 80-90% capacity).

Responsive to the control circuitry 32 detecting the rechargeable cells 28 reaching the maximum voltage, the control circuitry 32 may control the battery charger 24 to switch the mode of operation during the charge cycle of the cells 28 from the constant current mode of operation to the constant voltage mode of operation where main and secondary charging electrical energy individually having a constant voltage are used to charge the rechargeable cells 28. In one embodiment, main and secondary charging electrical energy in the form of main and secondary pulses individually having a voltage of the maximum voltage of the rechargeable cells 28 (e.g., 3.7 Volts) may be used during the constant voltage mode of operation. The constant voltage charging of the rechargeable cells 28, can be considered as trickle charging, which charges the rechargeable cells 28 to a maximum state of charge and which may be used to sustain the rechargeable cells 28 at the maximum voltage and maximum state of charge in one embodiment. During the constant voltage charging portion of a charge cycle, the current of the constant voltage charging electrical energy may drop from an initial amount (e.g., 1-2 Amperes) to zero (or a relatively small current (~mA)) which indicates the rechargeable cells 28 are fully charged (and the battery charger 24 may be disconnected in one embodiment). Other states of charge of the rechargeable cells 28 may be used to switch from use of constant current charging electrical energy to constant voltage charging electrical energy in other embodiments. Furthermore, other charging schemes may be used in other embodiments.

At least some arrangements of the disclosure provide efficient charging of batteries 22 including a plurality of rechargeable cells 28. For example, in one embodiment, relatively large pulses of current may be used to quickly charge the batteries 22 while providing substantially balanced charging of the rechargeable cells 28. Selective application of secondary charging electrical energy to rechargeable cells 28 having lower states of charge compared with others of the rechargeable cells 28 (in addition to main charging electrical energy applied to all of the rechargeable cells) provides increased balancing of the states of charge of the rechargeable cells 28 of the battery 22 in some embodiments compared with arrangements where only the main charging electrical energy is used for charging. In addition, the use of main and secondary charging electrical energy according to some embodiments may provide operation at the full capacity of the battery (or substantially full capacity) as well as maintain the capacity of the battery over numerous charge and discharge cycles. Furthermore, at least some embodiments of the disclosure implement balancing without resistor shunting schemes which can lead to generation of heat and elevated operational temperatures.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An electrical system comprising: charge circuitry configured to apply a plurality of main charging pulses of electrical energy to a plurality of rechargeable cells of a battery to charge the rechargeable cells during a common charge cycle of the battery and to apply a plurality of secondary charging pulses of electrical energy to less than all of the rechargeable cells of the battery during the common charge cycle of the battery to charge the less than all of the rechargeable cells;
wherein the charge circuitry is configured to apply the main charging pulses comprising constant current charging pulses and constant voltage charging pulses; and
wherein the charge circuitry is further configured to apply the constant current charging pulses to the rechargeable cells having states of charge less than a defined state of charge and to apply the constant voltage charging pulses to the rechargeable cells having states of charge greater than the defined state of charge.

2. The electrical system of claim 1 wherein the charge circuitry applies the secondary charging pulses of electrical energy to the less than all of the rechargeable cells of the battery which individually have a lower state of charge than states of charge of others of the rechargeable cells not receiving the secondary charging pulses of electrical energy during the common charge cycle of the battery.

3. The electrical system of claim 2 wherein the charge circuitry applies the secondary charging pulses of electrical energy to the individual ones of the less than all of the rechargeable cells to charge the less than all of the rechargeable cells at a faster rate of charge compared with rates of charge of the others of the rechargeable cells not receiving the secondary charging pulses of electrical energy during the common charge cycle of the battery.

4. The electrical system of claim 1 wherein the charge circuitry is configured to apply the secondary charging pulses of electrical energy to the less than all of the rechargeable cells of the battery responsive to individual ones of the less than all of the rechargeable cells of the battery having a lower state of charge than states of charge of others of the rechargeable cells not receiving the secondary charging pulses of electrical energy during the common charge cycle of the battery.

5. The electrical system of claim 1 wherein the charge circuitry applies the secondary charging pulses of electrical energy to only one of the rechargeable cells.

6. The electrical system of claim 1 wherein the charge circuitry is configured to apply individual ones of the secondary charging pulses of electrical energy for individual ones of the less than all of the rechargeable cells intermediate respective pairs of the main charging pulses which are immediately adjacent to the individual ones of the secondary charging pulses of electrical energy.

7. The electrical system of claim 1 wherein the charge circuitry comprises a main charger configured to apply the main charging pulses of electrical energy to the rechargeable cells and a plurality of secondary chargers configured to apply respective ones of the secondary charging pulses of electrical energy to respective ones of the less than all of the rechargeable cells.

8. The electrical system of claim 1 wherein the charge circuitry comprises a main charger configured to apply the main charging pulses of electrical energy to the rechargeable cells and a secondary charger configured to generate the secondary charging pulses, and further comprising switching circuitry configured to provide the secondary charging pulses to different ones of the less than all of the rechargeable cells.

9. The electrical system of claim 1 wherein the charge circuitry is configured to apply the main charging pulses and the secondary charging pulses to the rechargeable cells to provide substantially balanced charging of the rechargeable cells during the common charge cycle of the battery wherein the rechargeable cells have substantially the same state of charge during the common charge cycle.

10. A battery charger comprising: charge circuitry configured to apply different numbers of charging pulses of electrical energy to different ones of a plurality of rechargeable cells of a battery during a common charge cycle of the battery and corresponding to the rechargeable cells having different states of charge;
wherein the charge circuitry is configured to apply the main charging pulses comprising constant current charging pulses and constant voltage charging pulses; and
wherein the charge circuitry is further configured to apply the constant current charging pulses to the rechargeable cells having states of charge less than a defined state of charge and to apply the constant voltage charging pulses to the rechargeable cells having states of charge greater than the defined state of charge.

11. The charger of claim 10 wherein at least one of the rechargeable cells has a lower state of charge compared with states of charge of others of the rechargeable cells, and wherein the charge circuitry is configured to apply an increased number of the charging pulses of electrical energy to the at least one of the rechargeable cells during the common charge cycle compared with individual numbers of the charging pulses of electrical energy applied to the others of the rechargeable cells during the common charge cycle.

12. The charger of claim 10 wherein at least one of the rechargeable cells has a lower state of charge compared with states of charge of others of the rechargeable cells, and wherein the charge circuitry is configured to apply a plurality of the charging pulses comprising main charging pulses to all of the rechargeable cells during the common charge cycle and to apply a plurality of the charging pulses comprising secondary charging pulses to only the at least one of the rechargeable cells.

13. An electrical system comprising:
a battery comprising a plurality of rechargeable cells individually configured to receive charging electrical energy and to discharge electrical energy to a load;
charge circuitry configured to apply a plurality of main charging pulses to the rechargeable cells to charge the rechargeable cells during a common charge cycle of the battery and to apply a plurality of secondary charging pulses to at least one of the rechargeable cells during the common charge cycle of the battery;
monitoring circuitry configured to monitor states of charge of the rechargeable cells during the common charge cycle of the battery and to detect the at least one of the rechargeable cells having a state of charge lower than states of charge of others of the rechargeable cells of the battery; and control circuitry coupled with the monitoring circuitry and configured to use the monitoring of the monitoring circuitry to control the charge circuitry to apply the secondary charging pulses to the at least one of the rechargeable cells having the lower state of charge than the states of charge of the others of the rechargeable cells to substantially balance the state of charge of the at least one of the rechargeable cells with the states of charge of the others of the rechargeable cells during the common charge cycle of the battery;

wherein the charge circuitry is configured to apply the main charging pulses comprising constant current charging pulses and constant voltage charging pulses; and wherein the charge circuitry is further configured to apply the constant current charging pulses to the rechargeable cells having states of charge less than a defined state of charge and to apply the constant voltage charging pulses to the rechargeable cells having states of charge greater than the defined state of charge.

14. The system of claim 13 wherein the control circuitry is configured to cease the application of the secondary charging pulses during the common charge cycle to the at least one of the rechargeable cells after the state of charge of the at least one of the rechargeable cells is substantially balanced with the states of charge of the others of the rechargeable cells.

15. A rechargeable battery charging method comprising:
applying electrical energy to a first number of rechargeable cells of a battery at a plurality of first moments in time to charge the first number of rechargeable cells during a common charge cycle of the battery,
wherein applying electrical energy to the first number of rechargeable cells comprises applying charging pulses comprising constant current charging pulses and constant voltage charging pulses;
and wherein applying electrical energy to the first number of rechargeable cells further comprises applying the constant current charging pulses to the rechargeable cells having states of charge less than a defined state of charge and applying the constant voltage charging pulses to the rechargeable cells having states of charge greater than the defined state of charge;
monitoring an electrical characteristic of the rechargeable cells; and
using the monitoring, applying electrical energy to a second number of the rechargeable cells of the battery at a plurality of second moments in time to charge the second number of the rechargeable cells during the common charge cycle of the battery, and wherein the second number is less than the first number.

16. The method of claim 15 wherein the applyings of the electrical energy at the first and second moments in time individually comprise applying a plurality of charging pulses of the electrical energy.

17. The method of claim 15 wherein individual ones of the second number of the rechargeable cells have a lower state of charge compared with states of charge of the rechargeable cells not receiving electrical energy at the second moments in time.

18. The method of claim 17 wherein the application of the electrical energy to the second number of the rechargeable cells is responsive to the monitoring detecting individual ones of the second number of the rechargeable cells having the lower state of charge.

19. The method of claim 17 wherein the application of electrical energy to the second number of the rechargeable cells increases the rate of charge of individual ones of the second number of the rechargeable cells.

20. The method of claim 15 wherein the application of the electrical energy to the second number of the rechargeable cells comprises applying to only one of the rechargeable cells.

21. The method of claim 15 wherein the application of the electrical energy to the second number of the rechargeable cells comprises applying the electrical energy to a first and a second of the rechargeable cells prior to one of the second moments in time and only applying the electrical energy to one of the first and second rechargeable cells after the one of the second moments in time.

22. The method of claim 21 wherein the application of the electrical energy to the second number of the rechargeable cells comprises terminating the application of the electrical energy to an other of the first and the second of the rechargeable cells after the one of the second moments in time.

23. The method of claim 22 wherein the termination comprises terminating responsive to the monitoring detecting a state of charge of the other of the first and the second of the rechargeable cells being substantially balanced with respect to states of charge of the first number of the rechargeable cells.

24. The method of claim 15 wherein the application of the electrical energy to the second number of the rechargeable cells comprises applying the electrical energy at the second moments in time which are individually intermediate a pair of the first moments in time which are immediately adjacent to the individual one of the second moments in time.

25. The method of claim 15 wherein the applications of electrical energy comprise applications of electrical energy to substantially balance the rechargeable cells of the battery during the common charge cycle providing the rechargeable cells at substantially the same state of charge during the common charge cycle.

26. The method of claim 15 wherein the application of the electrical energy to the first number of rechargeable cells comprises applying the electrical energy to all of the rechargeable cells of the battery.

27. The method of claim 15 wherein applying electrical energy to the first number of rechargeable cells further comprises initially first applying a plurality of charging pulses having a constant current and thereafter second applying a plurality of charging pulses having a constant voltage.

28. The method of claim 27 further comprising changing from the first application of electrical energy to the second application of electrical energy after the rechargeable cells have obtained a defined state of charge.

29. The method of claim 15 further comprising providing the electrical energy to charge the second number of the rechargeable cells using a secondary charger, and wherein the applying the electrical energy to the second number of the rechargeable cells comprises selectively coupling the secondary charger with individual ones of the second number of the rechargeable cells at different moments in time.

30. A rechargeable battery charging method comprising:
applying a plurality of main charging pulses of electrical energy to charge a plurality of rechargeable cells of a battery during a common charge cycle of the battery; and during the common charge cycle of the battery, applying a plurality of secondary charging pulses of electrical energy to charge at least one of the rechargeable cells of the battery having a lower state of charge compared with states of charge of others of the rechargeable cells of the battery;

wherein applying the main charging pulses comprises applying charging pulses comprising constant current charging pulses and constant voltage charging pulses;

and wherein applying the main charging pulses further comprises applying the constant current charging pulses to the rechargeable cells having states of charge less than a defined state of charge and applying the constant voltage charging pulses to the rechargeable cells having states of charge greater than the defined state of charge.

31. The method of claim 30 wherein the application of the main charging pulses comprises applying to all of the rechargeable cells of the battery and the application of the secondary charging pulses comprises applying to less than all of the rechargeable cells of the battery.

32. The method of claim 30 further comprising: monitoring an electrical characteristic of the rechargeable cells of the battery; and detecting the at least one of the rechargeable cells having the lower state of charge, and wherein the applying the secondary charging pulses is responsive to the detecting.

33. The method of claim 30 further comprising ceasing the application of the secondary charging pulses during the common charge cycle responsive to the state of charge of the at least one of the rechargeable cells being substantially balanced with the states of charge of the others of the rechargeable cells.

34. The method of claim 30 wherein the application of the secondary charging pulses increases a rate of charge of the at least one of the rechargeable cells compared with rates of charge of the others of the rechargeable cells.

35. The method of claim 30 wherein the application of the secondary charging pulses to charge the at least one of the rechargeable cells having the lower state of charge comprises applying individual ones of the secondary charging pulses between respective pairs of the main charging pulses.

* * * * *